S. M. T. BARCLAY.
NUT LOCK.
APPLICATION FILED MAY 17, 1911.

1,019,215.

Patented Mar. 5, 1912.

Witnesses
William Smith

Inventor
Samuel M. T. Barclay
By Victor J. Evans
Attorney

UNITED STATES PATENT OFFICE.

SAMUEL M. T. BARCLAY, OF DUBOIS, PENNSYLVANIA.

NUT-LOCK.

1,019,215.  Specification of Letters Patent.  Patented Mar. 5, 1912.

Application filed May 17, 1911. Serial No. 627,734.

*To all whom it may concern:*

Be it known that I, SAMUEL M. T. BARCLAY, a citizen of the United States, residing at Dubois, in the county of Clearfield and State of Pennsylvania, have invented new and useful Improvements in Nut-Locks, of which the following is a specification.

This invention relates to nut locks, and has for an object to provide a device of this character embodying a novel form of spring washer member having a free spring portion bearing against the nut to hold the same in its adjusted position on the bolt, the opposite end portion of the washer being formed to provide an anchoring spur to be embedded in the object with which the bolt is engaged.

Figure 1:
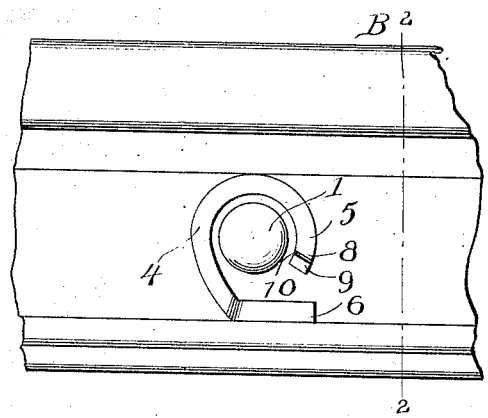
Figure 3:
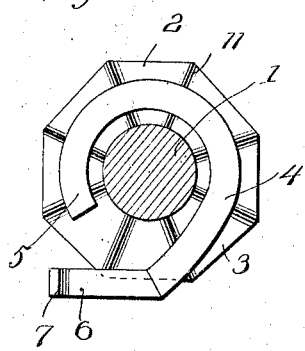
Figure 4:
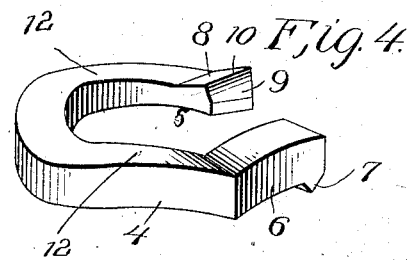
Figure 5:
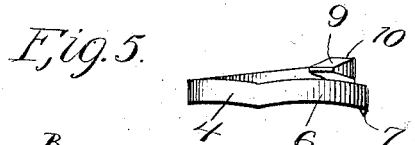
Figure 2:
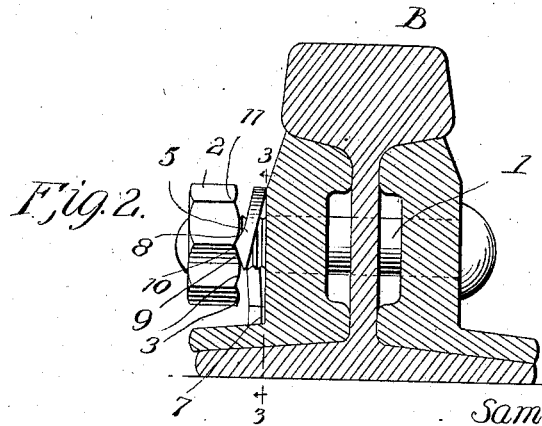

In the drawing, forming a portion of this specification and in which like numerals of reference indicate similar parts in the several views:—Figure 1 is a side elevation of a portion of a rail joint showing a retaining bolt applied thereto and equipped with my improved nut lock, the nut being omitted. Fig. 2 is a section on line 2—2 of Fig. 1 showing the nut in an applied position. Fig. 3 is a section on line 3—3 of Fig. 2. Fig. 4 is an inverted perspective view of the locking washer. Fig. 5 is an edge view thereof.

My improved nut lock while being designed for use on various forms of machinery or the like is principally designed as herein shown for attachment to the retaining bolt of the rail joint B. The rail joint is of common construction, being provided with the usual fish plates C which are arranged at the sides of the vertical webs of the rail ends. The bolt 1 is extended through the fish plates and through the rail, and as shown, it is threaded at one end to adjustably receive the retaining or clamping nut 2. This nut is substantially of common configuration and on its inner surface it is formed to provide curved abutment or gripping surfaces 3, the adjacent faces being extended in opposite directions and terminating at their ends substantially on lines drawn radially through the axis of the nut and through the points of intersection of the side faces of the nut as clearly shown in the drawing. The locking washer 4 is formed preferably from a single strip of flat spring steel bent substantially spirally to form the spring locking portion 5 and the fixed anchoring portion 6. The anchoring portion 6 extends peripherally beyond the washer element and at its extremity it is constructed to form a relatively sharp tooth 7 to engage the object with which the bolt 1 is engaged. In the present instance, the tooth 7 engages the fish plate of the rail joint and it is held associated therewith so as to be positively retained against rotation. The free spring portion 5 of the washer-plate is formed on its outer surface to provide the oppositely curved relatively broad and long contacting faces 8 and 9 and at the point of intersection of these faces the thickness of the washer-plate is increased and formed to provide a relatively pointed tooth 10 to be engaged in the recesses 11 which are formed between the surfaces 3 of the nut.

The steel strip forming the washer is preferably tapered longitudinally throughout and substantially fluted intermediate the portions 7 and 10 respectively, so as to present the outer convexed surfaces 12 which are adapted to be engaged by the locking surface of the nut when the latter is operatively screwed upon the bolt. The pressure of the nut which will be brought to bear against the surfaces 12 will operate to bend the washer so as to cause effective positive engagement of the tooth 10 in the receiving recesses 11 in the nut. By constructing the washer as just described, its elasticity is greatly increased and its engagement with the nut and with the object against which it is associated will be such that it will be positively held against movement about the bolt.

From the construction described it will be seen that the nut may be threaded onto the bolt in the usual manner. Its movement will gradually be retarded when it contacts with the free spring portion of the washer-plate and when the limit of adjustment of the nut has been obtained the tooth portion 10 of the washer-plate will be effectively engaged with the nut to hold it against rotation in one direction. The relatively broad and long faces 8 and 9 on the spring end of the washer-plate conform substantially in configuration with the surfaces 3 of the nut 2 to engage the adjacent faces of the recesses 11 in which the tooth 10 of the said washer-plate is engaged.

I claim:—

1. A nut lock comprising a threaded bolt, a nut adjustably mounted on the bolt and provided with a circular series of oppositely curved surfaces, and a substantially spiral washer-plate of spring material having one end formed to provide an anchoring portion and having its opposite end formed to provide oppositely curved surfaces conforming substantially in configuration with the inner surfaces of the nut and having locking engagement therewith to hold the nut against rotation on the bolt in one direction.

2. In a nut lock, a bolt, an adjustable nut thereon, the said nut being formed on its inner face to provide a series of curved surfaces, the surfaces being formed so as to present on the inner face of the nut an annular series of recesses, and a spring washer-plate removably mounted on the bolt at one side of the nut and having a spring free portion formed to provide a tooth for interchangeable locking engagement with the recesses on the inner face of the nut and formed to provide oppositely curved surfaces for frictionally contacting with the said curved surfaces on the inner face of the nut.

3. In a nut lock, a bolt, an adjustable nut thereon, the said nut being formed on its inner face to provide a series of curved surfaces, the surfaces being formed so as to present on the inner face of the nut an annular series of recesses, and a spring washer-plate removably mounted on the bolt at one side of the nut and having a spring free portion formed to provide a tooth for interchangeable locking engagement with the recesses on the inner face of the nut and formed to provide oppositely curved surfaces for frictionally contacting with the said curved surfaces on the inner face of the nut, the said washer-plate having its opposite end formed to provide an anchoring portion for locking engagement with the object with which the nut is engaged.

In testimony whereof I affix my signature in presence of two witnesses.

SAMUEL M. T. BARCLAY.

Witnesses:
W. F. SMITH,
MARY SIMMONS.